United States Patent
Hobbs

(10) Patent No.: US 8,152,875 B2
(45) Date of Patent: *Apr. 10, 2012

(54) METHOD AND APPARATUS FOR PRODUCING METHANE FROM CARBONACEOUS MATERIAL

(75) Inventor: Raymond S Hobbs, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/543,398

(22) Filed: Aug. 18, 2009

(65) Prior Publication Data

US 2010/0024298 A1 Feb. 4, 2010

Related U.S. Application Data

(63) Continuation of application No. 11/138,638, filed on May 26, 2005, now Pat. No. 7,575,613.

(51) Int. Cl.
*C10J 3/46* (2006.01)

(52) U.S. Cl. ............... 48/197 R; 48/63; 48/77; 48/206; 48/207; 48/210; 423/648.1

(58) Field of Classification Search .............. 48/76, 206, 48/197 R, 77, 210, 202; 110/261, 264, 347; 423/648.1; 208/8; 201/44; 422/232

See application file for complete search history.

(56) References Cited

U.S. PATENT DOCUMENTS

| | | | | |
|---|---|---|---|---|
| 3,854,896 A | * | 12/1974 | Switzer et al. | 48/210 |
| 3,985,519 A | * | 10/1976 | Kalina et al. | 48/202 |
| 7,500,997 B2 | * | 3/2009 | Norbeck et al. | 48/127.7 |
| 7,575,613 B2 | * | 8/2009 | Hobbs | 48/197 R |

* cited by examiner

*Primary Examiner* — Nina Bhat
(74) *Attorney, Agent, or Firm* — Snell & Wilmer L.L.P.

(57) ABSTRACT

A method for producing methane (69) from a carbonaceous (22) material includes conveying pulverized carbonaceous material (28) entrained in an inert carrier fluid, such as carbon dioxide (36), into a reactor (34). The reactor (34) includes a vortex region (72) for receiving hydrogen gas (38) and imparting a swirling motion to the hydrogen gas (38). The pulverized carbonaceous material (28) is exposed to the swirling stream of hydrogen gas (38) in a first reaction zone (114) within the reactor (34) to form an exit gas (40) that includes methane (69). Remaining unreacted carbonaceous material (28) is further exposed to the hydrogen gas (38) in a second, low velocity, reaction zone (120). The methane rich exit gas (40) is subsequently extracted from the reactor (34) for further processing.

20 Claims, 4 Drawing Sheets

METHOD AND APPARATUS FOR PRODUCING METHANE FROM CARBONACEOUS MATERIAL

CROSS-REFERENCE TO RELATED APPLICATIONS

This application is a continuation of and claims priority to U.S. patent application Ser. No. 11,138,638, entitled "METHOD AND APPARATUS FOR PRODUCING METHANE FROM CARBONACEOUS MATERIAL" which was filed on May 26, 2005, now U.S. Pat. No. 7,575,613, and is incorporated herein by reference.

TECHNICAL FIELD OF THE INVENTION

The present invention relates to the field of energy production. More specifically, the present invention relates to a hydrogasification process for producing methane from carbonaceous material.

BACKGROUND OF THE INVENTION

Due to the finite supply of fossil energy sources, the global environmental damage caused by fossil fuels, increasing energy demand, and economic forces, society is becoming compelled to both diversify energy resources and utilize existing fossil fuels more effectively.

One emerging energy resource that has received significant attention is hydrogen. Hydrogen is recognized by many as a key component to a clean, sustainable energy system. Some experts believe that hydrogen may eventually form the basic energy infrastructure to power future societies, replacing today's natural gas, oil, coal, and electricity infrastructures.

Most of the world's current supply of hydrogen is derived from fossil fuels by, for example, steam reforming natural gas, partial oxidation of oil, and water electrolysis using electricity from conventional energy resources. However, it is envisioned that renewable sources, such as biomass, wastes, water, wind, and sun may eventually be cost effectively harnessed to produce hydrogen. A plentiful supply of inexpensive hydrogen from renewable sources may greatly contribute to the diversification of the current energy structure from fossil fuels to hydrogen.

Unfortunately, the lack of practical storage and transport methods has hindered more widespread development and use of hydrogen fuels. The storage and transport of hydrogen can take place in its free form ($H_2$) or chemically bound. Hydrogen is one of the lightest elements and has very small molecules. Thus, the storage of hydrogen in its free form (i.e., liquid hydrogen and compressed hydrogen) is complex because it can escape from tanks and pipes more easily than conventional fuels. To limit hydrogen escape, the fuel must be kept at extremely low temperatures or high pressures which are energy intensive and costly. This hydrogen volatility and low temperature and/or high pressure requirements suggest that no infrastructure for storage and transport of hydrogen in its free form will be developed quickly.

Chemically binding hydrogen usually takes the form of the reaction of a metal with hydrogen to create a metal hydride, although chemical binding with carbonaceous materials to form, for example, methane or methanol has also been explored. Indeed, significant research is being directed toward chemically binding hydrogen with carbonaceous materials to form methane-rich gas because the methane-rich gas can be transported through the existing natural gas pipeline infrastructure.

Although coal is a fossil fuel, it is a relatively plentiful carbonaceous material. Approximately forty percent of the earth's current electricity production is powered by coal. In steam turbines, coal is pulverized, mixed with oxygen, and burned, with the heat producing steam that operates an electric generator. An unfortunate side effect of this process is that many harmful and toxic pollutants are released into the air. In particular, emissions from coal-fired power plants represent the largest source of artificial carbon dioxide emissions. Therefore, with plentiful, inexpensive coal likely to be utilized in the foreseeable future, and during the transition away from fossil fuels, developing more advanced clean coal technologies is essential.

Gasification processes convert coal and other solid fuels to synthesis gas for the production of electricity and transportation fuels. Coal gasification offers one of the most versatile and cleanest ways to convert the energy content of coal into electricity, hydrogen, and other energy forms. Moreover, with a plentiful supply of inexpensive hydrogen, the variant of gasification, i.e., hydrogasification, utilizing the plentiful coal may be a viable option for converting the excess hydrogen to transportable methane-rich gas.

Hydrogasification is an exothermic gasification process in which hydrocarbons are broken down into a methane-rich gas in a hydrogen atmosphere. The main reactions are:

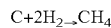

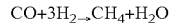

The methane-rich, low tar gas can be passed through a high temperature gas clean-up stage, where contaminants can be removed. Following the gas cleaning operation, the methane-rich gas, also known as synthesis gas (syngas), may be piped to a utility plant.

The primary objective of hydrogasification is to upgrade organic wastes to a methane-rich gas with a low concentration of hydrogen that is readily transportable in a conventional pipeline infrastructure. In addition, this syngas can be burned directly in a combined cycle turbine. Despite its advantages, hydrogasification of carbonaceous materials has not been explored extensively for commercial purposes because the cost of hydrogen is considered prohibitive. In addition, the efficiency for a hydrogasification process to produce methane-rich gas is not yet sufficient to be economically feasible.

The problems to be surmounted in a hydrogasification process and apparatus, assuming a plentiful and inexpensive supply of free form hydrogen, include effective delivery and mixing of the carbonaceous material with hydrogen, and rapid reaction of the carbonaceous material with the hydrogen to form a methane-rich gas that is compatible with existing transportation and storage infrastructures.

Known hydrogasification processes typically utilize water or oil to form a slurry of carbonaceous material that is subsequently conveyed into a reactor. In addition, steam may be introduced into the hydrogasification and react with the char (carbon remains) to produce carbon monoxide and hydrogen, and to provide temperature control. These hydrogasification processes are economically inefficient, require complex and costly equipment, and call for an undesirably large quantity of water which is a commodity in arid regions.

SUMMARY OF THE INVENTION

Accordingly, it is an advantage of the present invention that a method and system for producing methane from a carbonaceous material are provided.

It is another advantage of the present invention that a method and system are provided that utilize hydrogen in a hydrogasification process to efficiently produce methane.

Another advantage of the present invention is that a method and system are provided for effective delivery and mixing of carbonaceous material with hydrogen without the introduction of water.

The above and other advantages of the present invention are carried out in one form by a method for producing methane from a carbonaceous material. The method calls for conveying the carbonaceous material entrained in an inert carrier fluid into a reactor. The carbonaceous material in the reactor is exposed to a swirling stream of a hydrogen gas to react the carbonaceous material with the hydrogen gas and form an exit gas that includes the methane. The exit gas is extracted from the reactor in response to the exposing operation.

The above and other advantages of the present invention are carried out in another one form by a system for producing methane from a carbonaceous material. The system includes a pulverizer for forming particulates of the carbonaceous material and a reactor in communication with the pulverizer. The reactor includes a fuel feed element having a first inlet for receiving the particulates of the carbonaceous material entrained in an inert carrier fluid from the pulverizer. The fuel feed element further has a first outlet. The reactor further includes a vortex region having a second inlet for receiving a hydrogen gas and having a second outlet. The vortex region imparts a swirling motion to the hydrogen gas to form a swirling stream of the hydrogen gas. A reaction tube is in fluid communication with each of the first and second outlets for exposing the carbonaceous material to the swirling stream of the hydrogen gas to react the carbonaceous material with the hydrogen gas and form an exit gas that includes the methane. A reactor outlet is in fluid communication with the reaction tube for extracting the exit gas from the reactor.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention provides a system and apparatus for reacting a carbonaceous material with hydrogen to produce a methane-rich exit gas. The invention is discussed below with reference to the use of coal. However, it should be understood that other carbon containing materials may alternatively be utilized, such as biomass, tar sands, bitumen, oils, biogas, wastewater solids, algae, agricultural products, and wastes.

Figure 1:
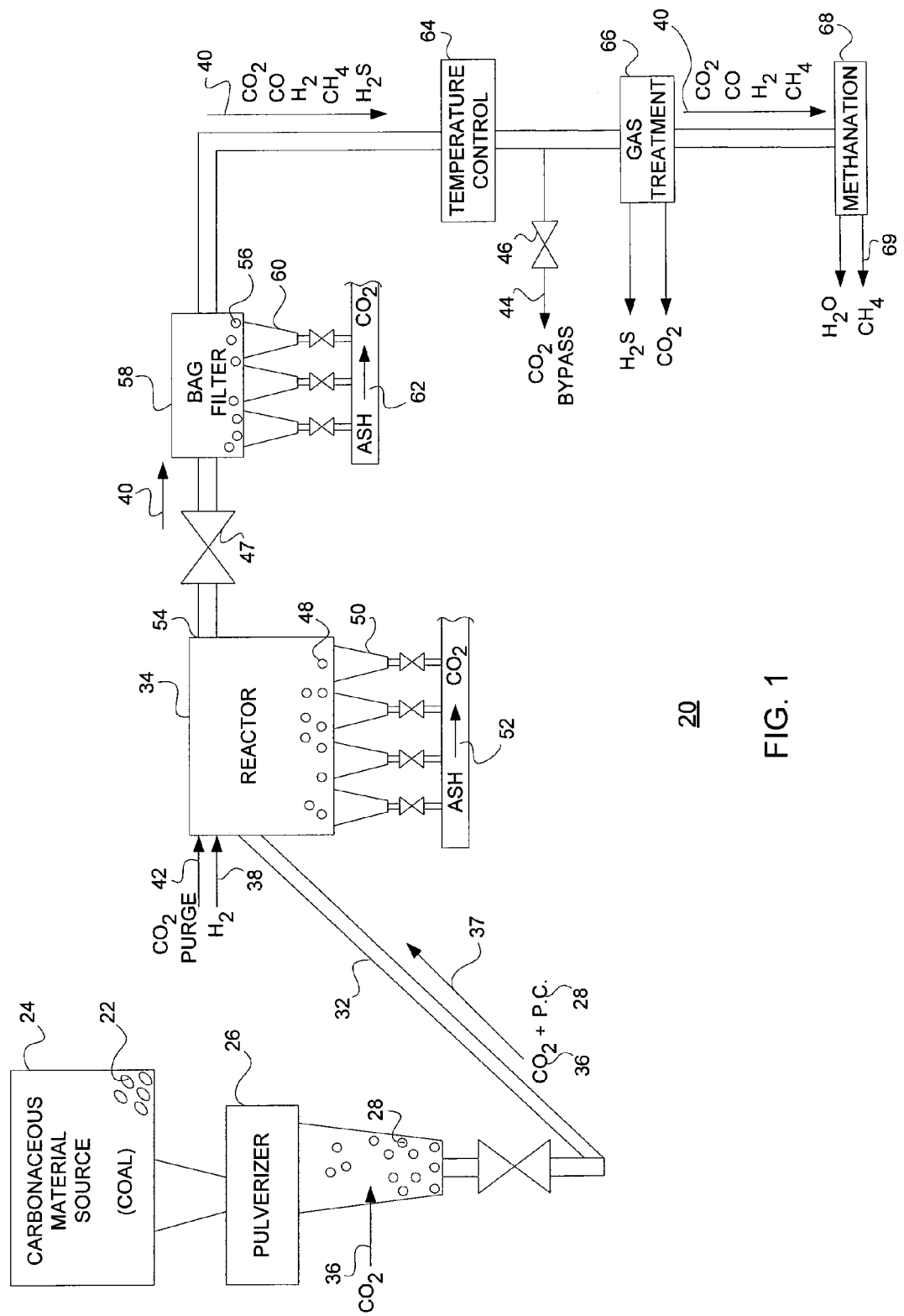
FIG. 1 shows a block diagram of a hydrogasification system in accordance with a preferred embodiment of the present invention.

FIG. 1 shows a block diagram of a hydrogasification system 20 in accordance with a preferred embodiment of the present invention. Hydrogasification system 20 reacts carbonaceous material with hydrogen in the absence of liquid water, steam, or oil by utilizing an inert carrier fluid to convey a particulate form of the carbonaceous material.

Hydrogasification system 20 receives a carbonaceous material, in this exemplary scenario coal 22, from a source 24. Carbonaceous material source 24 may be a conventional coal bunker from which coal 22 is fed through a coal feed to a pulverizer 26 of the present invention. Pulverizer 26 can pulverize coal 22 to form particulates, i.e., pulverized coal 28 (labeled P.C.), with at least seventy percent of pulverized coal 28 being sized to pass through a one hundred mesh screen (i.e., a particulate size of approximately one hundred forty nine microns). In a preferred embodiment, pulverizer 26 pulverizes coal to form particulates such that at least seventy percent of said pulverized coal 28 is sized to pass through a two hundred mesh screen (i.e., a particulate size of approximately seventy-four microns).

A lock hopper 30 and a screw conveyer 32 serve as a feed system for conveying pulverized coal 28 to a reactor 34. In general, pulverized coal 28 is transferred from pulverizer 26 and loaded into lock hopper 30 at atmospheric pressure. Pulverized coal 28 is pressurized to approximately 1200 psi using an inert carrier fluid. In a preferred embodiment, the inert carrier fluid is carbon dioxide ($CO_2$), represented by an arrow 36. However, other inert carrier fluids, i.e., relatively non-reacting gases or liquids, may alternatively be employed.

A fuel stream 37 of pulverized coal 28 entrained in carbon dioxide 36 is fed to reactor 34 with the help of screw conveyer 32. When lock hopper 30 is empty, the pressure in lock hopper 30 is reduced by venting carbon dioxide 36. The majority of carbon dioxide 36 may be vented to a tank (not shown) so that it can be recompressed and reused in the next cycle, and additional carbon dioxide 36 can be readily injected into the system since it is available as a waste gas from numerous other processes. Once lock hopper 30 is vented to atmospheric pressure, it is ready for the next cycle.

Hydrogasification system 20 is shown with only one lock hopper 30 used to convey pulverized coal 28 to reactor 34 for simplicity of illustration. However, it should be understood that the feed system may include two or more pressure-balanced lock hoppers which would be used alternately.

Coal particles that have caking properties have a tendency to stick together, cling to vessel walls, and plug reactor 34. Current hydrogasification technology dictates a partial combustion of raw coal to prevent the coal particles from sticking together. Entrainment in carbon dioxide 36 isolates the particles of pulverized coal 28 from one another to mitigate this caking problem. In addition, utilization of the dry feed system of the present invention eliminates the need for preparation of a conventional oil and coal slurry. Consequently, cost savings is achieved at the fuel feed system since there no need for a fluid-bed reactor for the partial combustion of the raw coal. Nor is there a need for a slurry feed system, a slurry-circulating pump, specialized materials that are resistant to degradation by the slurry oil, and the like.

Reactor 34 receives fuel stream 37 of pulverized coal 28 entrained in carbon dioxide 36 as well as hydrogen gas ($H_2$) 38. In a preferred embodiment, hydrogen gas 38 is produced in a separate process. For example, renewable sources, such as biomass, wastes, water, wind, and sun may be harnessed to produce an inexpensive and plentiful supply of hydrogen gas 38. Alternatively, hydrogen gas 38 may be derived from fossil fuels by, for example, steam reforming natural gas, partial oxidation of oil, and water electrolysis using electricity from conventional energy resources.

Pulverized coal 28 is exposed to hydrogen gas 38 in reactor 34 to react pulverized coal 28 with hydrogen gas 38, and form an exit gas 40 that is rich in methane, $CH_4$. In order to increase equilibrium methane yield, reactor 34 is pressurized to approximately 1000 psi. Pressurization of reactor 34 is performed utilizing a carbon dioxide purge 42 to flush out air, water vapor, and other contaminants from reactor 34. A downstream carbon dioxide bypass 44 enables the air, water vapor, and other contaminants to be removed from hydrogasification system 20. A valve 46, inline with carbon dioxide bypass 44, is closed following the purge of air, water vapor, and other contaminants from system 20. A second valve 47 may also be adjusted so that reactor 34 can be pressured to a higher pressure than downstream elements.

A high temperature of at least 1200° Fahrenheit, and preferably 1500° Fahrenheit, is needed in reactor 34 to obtain a reasonable reaction rate. Initially, reactor 34 undergoes pre-heating (discussed below). However, the reaction of pulverized coal 28 and hydrogen gas 38 is exothermic. Accordingly, once reaction begins, it will be self-sustaining, i.e., no supplementary combustion of some waste needs to take place within reactor 34.

In addition to its ability to mitigate coal caking problems, and to eliminate the need for coal pre-treatment and the preparation of coal slurry, carbon dioxide 36 is also advantageously utilized as an inert carrier fluid for pulverized coal 28 because it is less likely to react, so lower levels of carbon monoxide and non-methane hydrogen compounds will be formed in reactor 34, thereby driving greater methane production. By way of contrast, in prior art techniques that employ an oil/carbon slurry, the oil is not inert. Rather, the oil reacts and gasifies to produce carbon dioxide, carbon monoxide, and hydrogen compounds. Similarly, in prior art techniques that employ steam or water, the steam or water is also not inert. Rather, the steam or water reacts to free oxygen which subsequently bonds with carbon to produce carbon monoxide. Higher yields of carbon dioxide, carbon monoxide, and non-methane hydrogen compounds in these prior art systems effectively decrease the yield of methane because the carbon binds with the oxygen, rather than the hydrogen. Thus, an inert carrier fluid (i.e., carbon dioxide 36) will remain relatively inert in reactor 34, so that high efficiency of reaction of carbon and hydrogen is achieved.

As the carbon/hydrogen reaction takes place in reactor 34, non-reacted bottom ash 48 drops in reactor 34 and is collected into lock hoppers 50 pressurized with carbon dioxide 36. Lock hoppers 50 unload ash 48 into a secondary carbon dioxide gas stream 52, and ash 48 is conveyed away from reactor 34. Ash 48 may optionally be utilized for other industrial purposes. Further details of reactor 34 will be discussed below in connection with subsequent figures.

Exit gas 40 is directed through a reactor outlet 54 and through valve 47. Exit gas 40 includes a mixture of carbon dioxide ($CO_2$), carbon monoxide (CO), hydrogen gas ($H_2$), methane ($CH_4$), hydrogen sulfide ($H_2S$), fly ash 56, and other trace waste contaminants. The effective delivery of pulverized coal 28 entrained in carbon dioxide 36 and reaction with hydrogen 38 produces exit gas 40 having a very high methane concentration and low carbon monoxide and carbon dioxide concentrations.

Exit gas 40 enters a bag filter 58, also conventionally know as a bag house. In an exemplary embodiment, bag filter 58 is a particulate collection chamber that may contain numerous permeable fabric filters through which the exit gas 40 passes. Finer particulates, such as fly ash 56, mercury, and the like, entrained in exit gas 40 are collected in the fabric filters for subsequent treatment and/or disposal. Fly ash 56 and other particulates are removed from the fabric filters to fall into lock hoppers 60. Lock hoppers 60 unload fly ash 56 and other particulates into a carbon dioxide gas stream 62 to be conveyed away from hydrogasification system 20.

Following filtering at bag filter 58, exit gas 40 is transported through a temperature control element 64, sometimes referred to as an economizer. Temperature control element 64 may include a series of tubes (not shown) located in the path of exit gas 40. Feed water can be pumped through these tubes on its way to a boiler to absorb excess heat from exit gas 40. In an exemplary scenario, exit gas 40 may be cooled from approximately 1500° F. to approximately 750° F.

Following cooling, exit gas 40 passes to a gas treatment system 66 in order to remove solid residues as well as gaseous impurities from exit gas 40. In particular, sulfur and sulfur compounds may be removed, such as hydrogen sulfide ($H_2S$).

Clean exit gas 40 is then fed to a conventional methanation unit 68. Methanation unit 68 converts the remaining hydrogen and carbon monoxide in exit gas 40 into methane. However, since exit gas 40 has a high methane concentration and low carbon monoxide concentration, a relatively small methanation process need take place at methanation unit 68. The products of the methanation process performed at methanation unit 68 include water ($H_2O$) and methane ($CH_4$), represented by an arrow 69.

Figure 3:
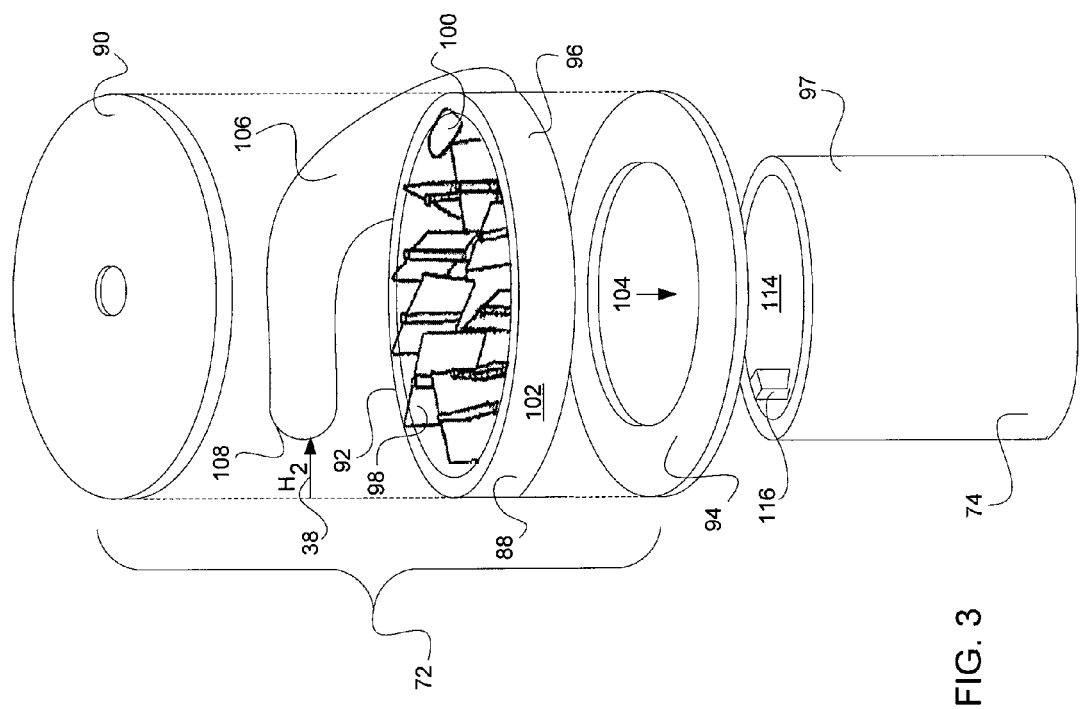
FIG. 3 shows an exploded side perspective view of a vortex region and reaction tube of the hydrogasification system of FIG. 1.
Figure 2:
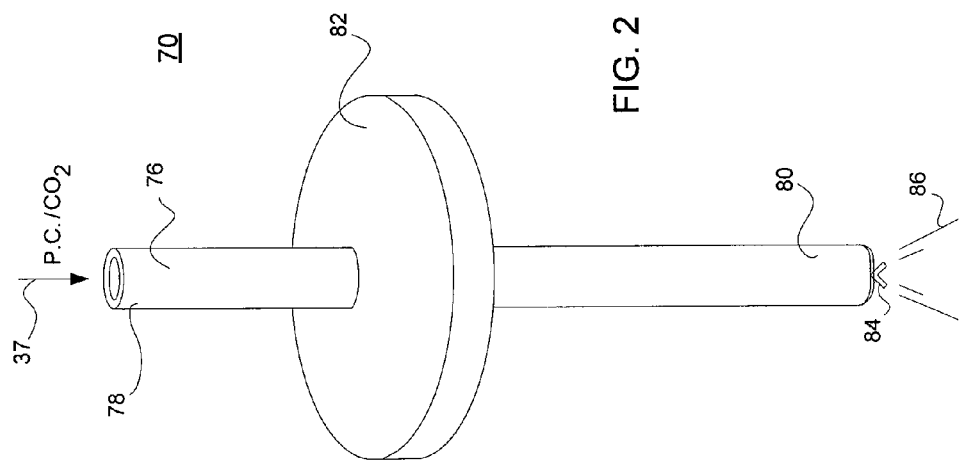
FIG. 2 shows an exploded side perspective view of a fuel feed element of the hydrogasification system of FIG. 1.
Figure 4:
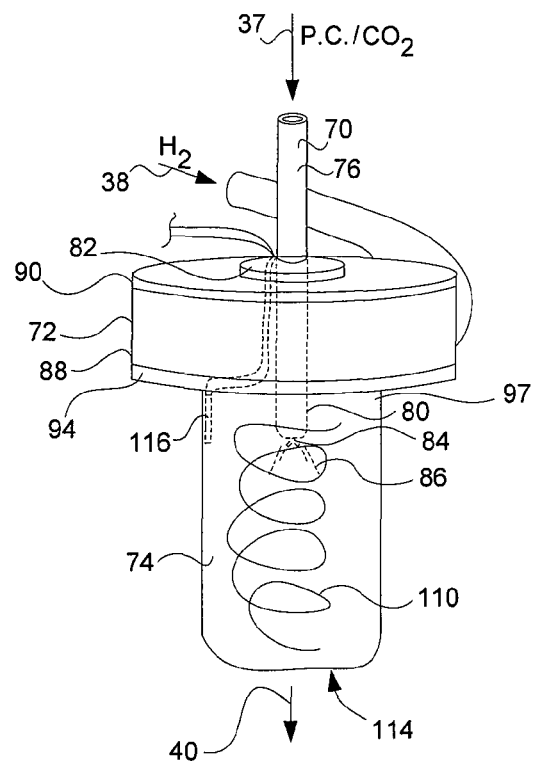
FIG. 4 shows a side view of an assembly formed by the combination of the fuel feed element of FIG. 2 with the vortex region and reaction tube of FIG. 3.

Referring to FIGS. 2-4, FIG. 2 shows an exploded side perspective view of a fuel feed element 70 of hydrogasification system 20 (FIG. 1). FIG. 3 shows an exploded side perspective view of a vortex region 72 and reaction tube 74 of hydrogasification system 20, and FIG. 4 shows a side view of an assembly 75 formed by the combination of the fuel feed element 70 with the vortex region 72 and reaction tube 74. Assembly 75 is located internal to reactor 34 (FIG. 1), and functions to effectively deliver and mix pulverized coal 28 entrained in carbon dioxide 36 with hydrogen gas 38. Reactor 34 is shown having only one assembly 75 for simplicity of illustration. However, it should be understood that reactor 34 may be adapted to include more than one assembly 75 depending in part upon reactor size and/or hydrogen availability.

Fuel feed element 70 includes a tubular member 76 having a first inlet 78 and a first outlet 80. A disc member 82 is positioned about tubular member 76, and a diffuser 84 is coupled to tubular member 76 at first outlet 80. First inlet 78 is in fluid communication with screw conveyor 32 (FIG. 1) for receiving fuel stream 37 of pulverized coal (P.C.) 28 entrained in carbon dioxide ($CO_2$) 36. Fuel stream 37 exits tubular member 76 at first outlet 80, and diffuser 84 disperses fuel stream 37 in a flared, or fan-shaped, pattern 86.

Vortex region 72 includes a generally cylindrical housing 88, a lid 90 coupled to a first end 92 of cylindrical housing 88 and a bottom 94 coupled to a second end 96 of cylindrical housing 88. Reaction tube 74 includes an inlet end 97 coupled to an exterior surface of bottom 94. Vanes 98 are located within cylindrical housing 88. Vanes 98 are located in housing 88 of the exploded view of FIG. 3 to illustrate their relative position and orientation within housing 88. However, vanes 98 may be coupled to an interior surface of housing 88, or may be coupled to either of lid 90 or bottom 94. In addition, vanes 98 are shown as being generally planar for simplicity of illustration. However, vanes 98 may have alternative shapes, such as that of an airfoil.

A second inlet 100 is formed on a circumferential surface 102 of cylindrical housing 88 and a second outlet 104 is formed in bottom 94. As shown, a curved tube 106 is coupled to housing 88 at second inlet 100. Hydrogen gas 38 is fed into vortex region 72 via an inlet 108 of curved tube 106. The curved nature of inlet tube 106, entry of hydrogen gas 38 through circumferential surface 102 of housing 88, and the orientation of vanes 98 imparts a swirling motion to hydrogen gas 38 to form a swirling stream 110 of hydrogen gas 38 that exits vortex region 72.

Inlet end 97 of reaction tube 74 is in fluid communication with each of first and second outlets 80 and 104, respectively. More specifically, as shown in assembly 75, tubular member 76 of fuel feed element 70 extends through lid 90 of vortex region 72, with disc member 82 forming the point of attachment between lid 90 and vortex region 72. Tubular member 76 passes through an interior 112 of cylindrical housing 88, and exits from second outlet 104 of bottom 94. Accordingly, first outlet 80 of tubular member 76 resides within inlet end 97 of reaction tube 74. In addition, inlet end 97 of reaction tube 74 abuts bottom 94 of vortex region 72 about second outlet 104. As such, flared pattern 86 of fuel stream 37 contacts swirling stream 110 of hydrogen gas 38 inside reaction tube 74.

As mentioned above, a temperature of at least 1200° Fahrenheit, and preferably 1500° Fahrenheit, is needed in reactor 34 to obtain a reasonable reaction rate. Accordingly, reaction tube 74 must be pre-heated to reach this temperature. Thereafter, the temperature remains high due to the exothermic reaction of pulverized carbon 28 and hydrogen 38. Reaction tube 74 includes a pre-heat element 116, or igniter. Pre-heat element 116 may be a conventional natural gas igniter, such as those used in boiler operation, for warming up reaction tube 74 prior to injection of fuel stream 37 and hydrogen gas 38 into reactor 34 (FIG. 1). Once reaction begins, pre-heat element 116 can be extinguished. Furthermore, in order to withstand such high reaction temperatures, reaction tube 74 is desirably formed from a heat resistant material, such as ceramic.

The interior of reaction tube 74 forms a first reaction zone 114 in which rapid and thorough mixing of fuel stream 37 and hydrogen gas 38 occurs under high heat (1500° F.-1800° F.) and high pressure conditions (1000 psi). Thus, pulverized coal 28 of fuel stream 37 contacts hydrogen gas 38, $H_2$, to form methane-rich exit gas 40.

Figure 5:
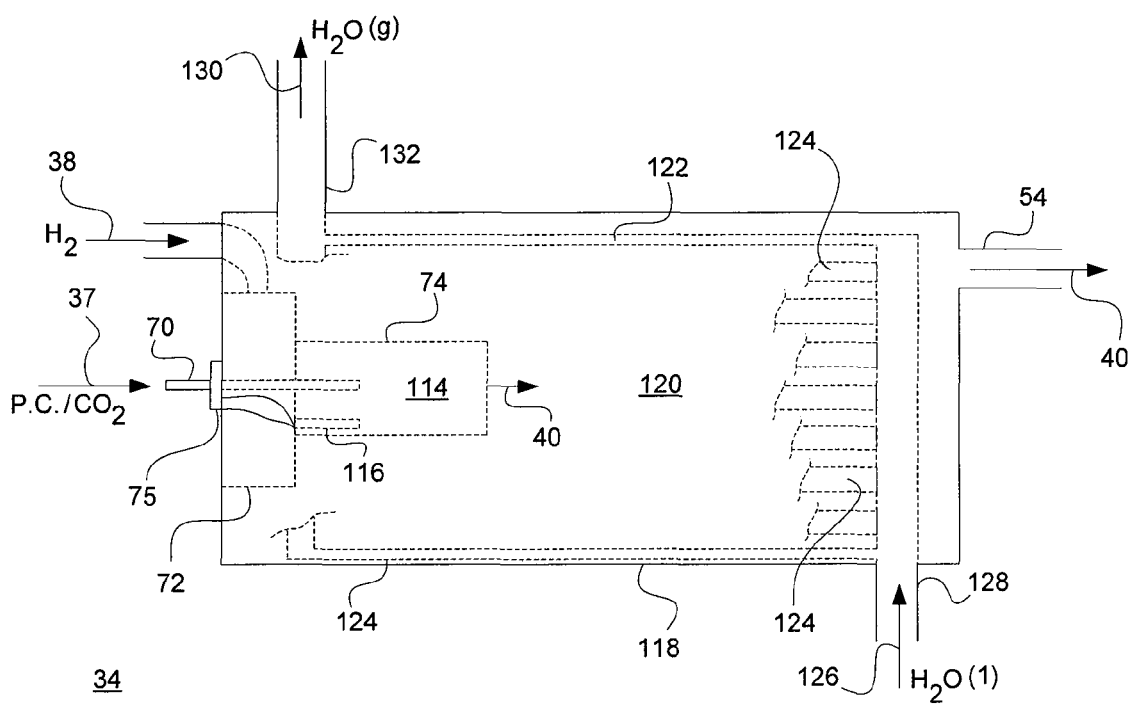
FIG. 5 shows a side view of a reactor of the hydrogasification system in which the assembly of FIG. 4 is installed.

FIG. 5 shows a side view of reactor 34 of hydrogasification system 20 (FIG. 1) in which assembly 75 is installed. Assembly 75 is installed inside a secondary reactor vessel 118 of reactor 34, and an interior of secondary reactor vessel 118 forms a second reaction zone 120. Exit gas 40 passes from first reaction zone 114 to second reaction zone 120 to react a remaining portion of pulverized coal 28 in exit gas 40 with a portion of unreacted hydrogen gas 38 in exit gas 40. In contrast to the high velocity swirling motion of hydrogen gas 38 in first reaction zone 114, second reaction zone 120 is a relatively low velocity region that exhibits a lower rate of reaction than first reaction zone 114. However, any reaction between pulverized coal 28 and hydrogen gas 38 occurring in second reaction zone 120 effectively increases the amount of methane in exit gas 40 that is extracted from reactor 34 at reactor outlet 54.

Of course, reactions occurring in each of first and second reaction zones 114 and 120, respectively, are exothermic thus produce heat. Although it is advantageous to maintain a temperature within reactor 34 of approximately 1500° F., it may be detrimental or dangerous to allow the temperature within reactor 34 to increase excessively. Accordingly, reactor 34 includes a heat exchanger, in the form of a water wall 122, lining reactor 34 about secondary reaction vessel 118.

Figure 6:
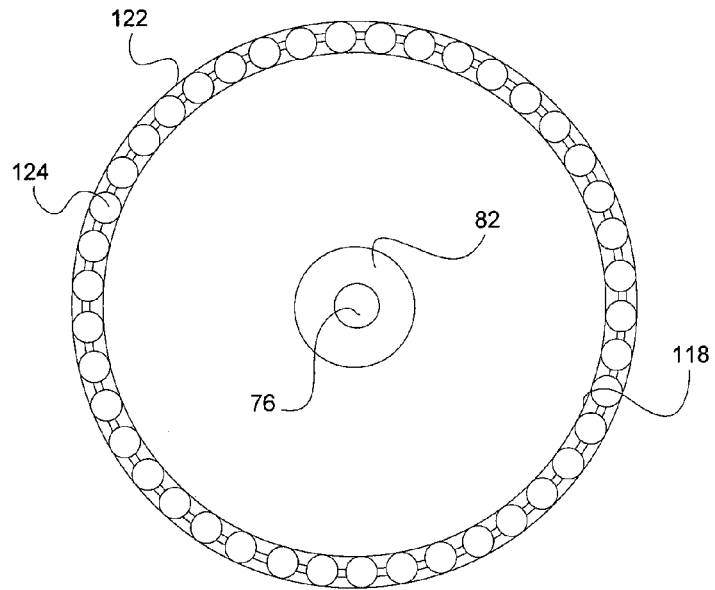
FIG. 6 shows an end view of the reactor of FIG. 5.

Referring to FIG. 6 in connection with FIG. 5, FIG. 6 shows an end view of reactor 34. In FIG. 5, a portion of water wall 122 is represented in ghost form for clarity of illustration, and the end view of reactor 34 in FIG. 6 illustrates water wall 122 lining secondary reactor vessel 118. In general, water wall 122 includes a row of interconnected water tubes 124 lining secondary reactor vessel 118. Water, represented by an arrow 126, is injected into water tubes 124 via a fluid inlet 128. Water 126 flows through water tubes 124 where it are exposed to the heat of reaction within first and second reaction zones 114 and 120. Water 126 absorbs this heat to control the temperature to a predetermined temperature, for example, 1500° F., and excess heat is selectively released in the form of discharge steam, represented by an arrow 130 at a fluid outlet 132. Heat energy stored in discharge steam 130 may be utilized for a secondary thermal process, such as heating a facility or generating electricity via a steam turbine (not shown), thus increasing the efficiency of hydrogasification system 20 (FIG. 1).

Figure 7:
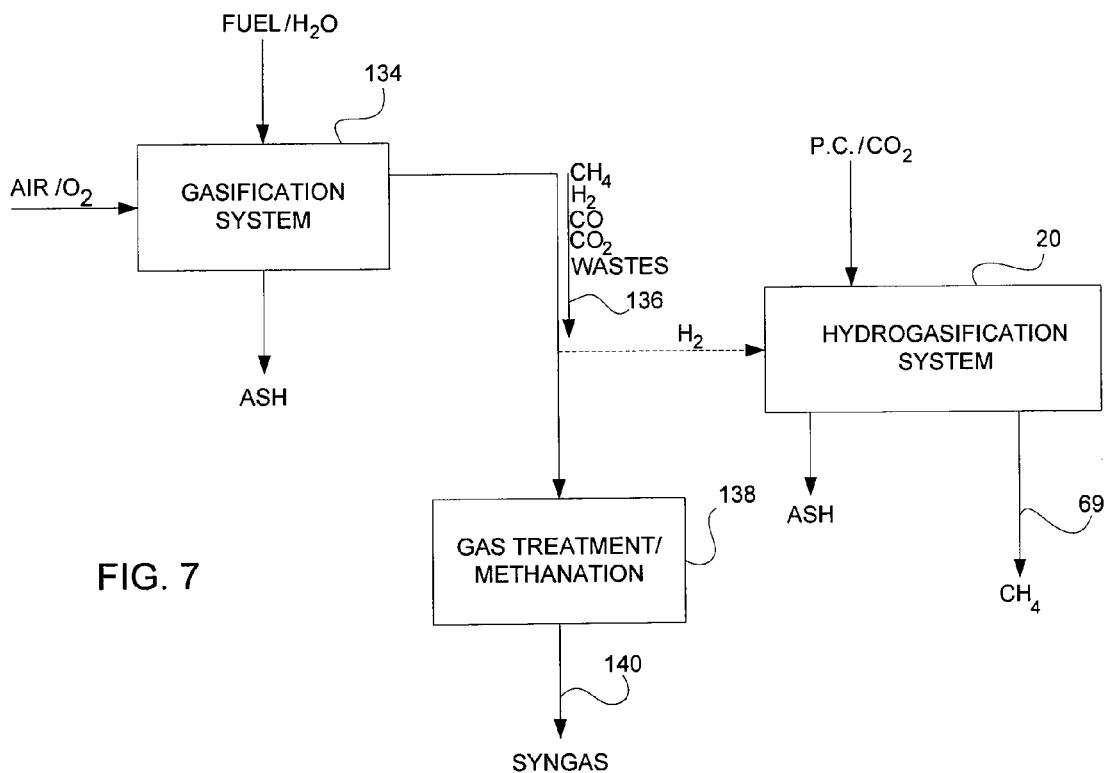
FIG. 7 shows a block diagram of the hydrogasification system of FIG. 1 operating in conjunction with a gasification system.

FIG. 7 shows a block diagram of hydrogasification system 20 operating in conjunction with a gasification system 134. Generally, gasification system 134 mixes organic materials, such as biomass, coal, and other carbon-based fuel, with water or steam in a gasification reactor of system 134. Air or oxygen may be injected into the reactor to create a partial oxidation reaction which yields a combustible gas 136 that typically includes carbon dioxide, carbon monoxide, hydrogen, methane, and other trace compounds. Combustible gas 136 may be conveyed to a gas treatment/methanation unit 138 to remove contaminants and to increase the methane content of combustible gas 136, to produce a synthesis gas 140, also referred to as syngas. Synthesis gas 140 may be utilized for the production of electricity and transportation fuels.

In the exemplary scenario illustrated in FIG. 7, some hydrogen gas ($H_2$) may optionally be diverted from combustible gas 136 and fed into hydrogasification system 20. That is, a large traditional partial oxidation gasification process may be utilized at gasification system 134 to generate hydrogen gas and methane, and a smaller hydrogasification system 20, as discussed above, could convert excess hydrogen gas into additional methane. This technique could significantly increase the efficiency of methane ($CH_4$) production over prior art systems. Although hydrogen is shown being dirverted from combustible gas 136 prior to gas treatment/methanation, is should be understood that excess hydrogen may alternatively be diverted from combustible gas 136 during or following gas treatment/methanation at unit 138.

In summary, the present invention teaches of a method and a hydrogasification system for producing methane from a carbonaceous material, such as coal. The method and system utilize excess hydrogen derived by other means to produce methane that is transportable through the conventional pipeline infrastructure. The coal, in a pulverized condition, is entrained in carbon dioxide and is mixed with swirling stream of hydrogen in a first reaction zone of a reactor. Remaining unreacted pulverized coal is then exposed to a lower velocity hydrogen environment in a second reaction zone. The mixing action of the hydrogen and pulverized coal in a high temperature, high pressure environment, and the two opportunities to react pulverized coal with hydrogen results in an efficient process for producing methane. In addition, utilizing carbon dioxide as an inert carrier fluid, and in the absence of water, simplifies reactor design and cost, as well as reduces water requirements. A reduction in the use of water is advantageous in an arid environment where water is a relatively scarce commodity.

Although the preferred embodiments of the invention have been illustrated and described in detail, it will be readily apparent to those skilled in the art that various modifications may be made therein without departing from the spirit of the invention or from the scope of the appended claims.

The invention claimed is:

1. A method for producing methane from a carbonaceous material, the method comprising the steps of:
   providing pulverized carbonaceous material to a reactor;
   providing a swirling stream of hydrogen gas to said reactor;
   preheating said reactor to at least 1200° F.;
   exposing said pulverized carbonaceous material in said reactor to said swirling stream of a hydrogen in the absence of added water to form an exit gas that includes said methane; and
   extracting said exit gas from said reactor.

2. The method as claimed in claim 1, wherein said step of providing pulverized carbonaceous material forms particulates of said carbonaceous material, with at least seventy percent of said particulates being sized to pass through a one hundred mesh screen.

3. The method as claimed in claim 1, wherein the step of providing pulverized carbonaceous material further comprises providing a carrier fluid and carrying said carbonaceous material in said carrier fluid.

4. The method as claimed in claim 1, further comprising the step of pressurizing said reactor to a reaction pressure of approximately 1000 psi.

5. The method as claimed in claim 1, wherein at least a portion of said hydrogen gas is produced from a renewable source.

6. The method as claimed in claim 1, wherein at least a portion of said hydrogen gas is produced from a gasification process.

7. The method as claimed in claim 1, wherein said step of providing pulverized carbonaceous material conveys said carbonaceous material under a feed pressure to an input of said reactor, said feed pressure being greater than a reactor pressure.

8. The method as claimed in claim 1, wherein said step of providing pulverized carbonaceous material comprises delivering a spray of said carbonaceous material to said reactor.

9. The method as claimed in claim 1, further comprising the steps of:
   delivering said hydrogen gas to a region of said reactor to impart a swirling motion to said hydrogen gas to form said swirling stream; and
   passing said swirling stream of said hydrogen gas from said region to a reaction zone to react said carbonaceous material with said hydrogen gas.

10. The method as claimed in claim 1, further comprising the step of exposing said exit gas to a methanation process.

11. The method as claimed in claim 1, further comprising the steps of capturing ash and transporting said ash from said reactor.

12. The method as claimed in claim 1, further comprising the step of utilizing heat generated from said reactor for a secondary thermal process.

13. A system for producing methane from a carbonaceous material, the system comprising:
   a pulverizer for forming particulates of carbonaceous material;
   a reactor including a region for receiving hydrogen gas and for imparting a swirling motion on said hydrogen gas, said reactor including an inlet for receiving said particulates of carbonaceous material and an outlet; and
   a screw conveyor for transporting said particulates of carbonaceous material under pressure to said inlet.

14. The system as claimed in claim 13, wherein said reactor is formed from a material having a heat resistance greater than fifteen hundred degrees Fahrenheit.

15. The system as claimed in claim 13, wherein said reactor includes a first reaction zone and a second reaction zone, said second reaction zone having a lower reaction rate than said first reaction zone.

16. The system as claimed in claim 15, wherein hydrogen gas in said second reaction zone exhibits a lower velocity than hydrogen gas in said first reaction zone.

17. The system as claimed in claim 16, wherein said first reaction zone is positioned inside a secondary reactor vessel.

18. The system as claimed in claim 13, further comprising a water wall adjacent said reactor.

19. A system for producing methane from a carbonaceous material, the system comprising:
   a pulverizer for forming particulates of carbonaceous material;
   a screw conveyor for moving said particulates of carbonaceous material in a gas;
   a renewable hydrogen source;
   a reactor for receiving hydrogen from said renewable hydrogen source and particulates of carbonaceous material and for imparting a swirling motion on said hydrogen; and
   a methanation unit for converting products from said reactor to methane.

20. The system as claimed in claim 19, wherein said particulates of carbonaceous material and said hydrogen react in the absence of added water.

* * * * *